United States Patent [19]

Ballard

[11] Patent Number: 5,209,133
[45] Date of Patent: May 11, 1993

[54] BLIND LEVER ARM ADJUSTMENT DEVICE

[75] Inventor: Michael D. Ballard, Sandy Hook, Conn.

[73] Assignee: Pitney Bowes Inc., Stamford, Conn.

[21] Appl. No.: 780,168

[22] Filed: Oct. 21, 1991

[51] Int. Cl.⁵ .................................. B65H 3/52
[52] U.S. Cl. .......................... 74/89.15; 474/101; 474/133; 271/117; 271/124; 271/273
[58] Field of Search .............. 271/117, 124, 125, 273, 271/274; 74/89.15; 474/101, 133

[56] References Cited

U.S. PATENT DOCUMENTS

| | | | |
|---|---|---|---|
| 2,277,885 | 3/1942 | Rodanet | 85/2.4 |
| 2,365,372 | 12/1944 | Allen | 45/137 |
| 2,688,894 | 9/1954 | Modrey | 85/2.4 |
| 3,166,972 | 1/1965 | Rapata | 85/72 |
| 4,501,417 | 2/1985 | Foster et al. | 271/124 |
| 4,548,400 | 10/1985 | Foster et al. | 271/226 |
| 4,728,095 | 3/1988 | Irvin et al. | 271/124 |

Primary Examiner—Allan D. Herrmann
Assistant Examiner—William O. Trousdell
Attorney, Agent, or Firm—Charles R. Malander, Jr.; Melvin J. Scolnick

[57] ABSTRACT

An adjustment device for adjusting a lever arm located inside a machine frame wherein the lever arm is pivotally mounted to the frame at a first location and is spring biased against a stop at a second location of the frame. The device comprises a resilient sleeve having a shank portion adapted to extend through an aperture in the frame to act as the stop, and a head portion of larger diameter then the diameter of the aperture in the frame. The shank portion has a threaded section and a non-threaded section, the non-threaded section having a length greater than the frame thickness at the aperture, wherein the lever arm pivots as a screw extending axially through the sleeve is turned in the threaded section.

5 Claims, 3 Drawing Sheets

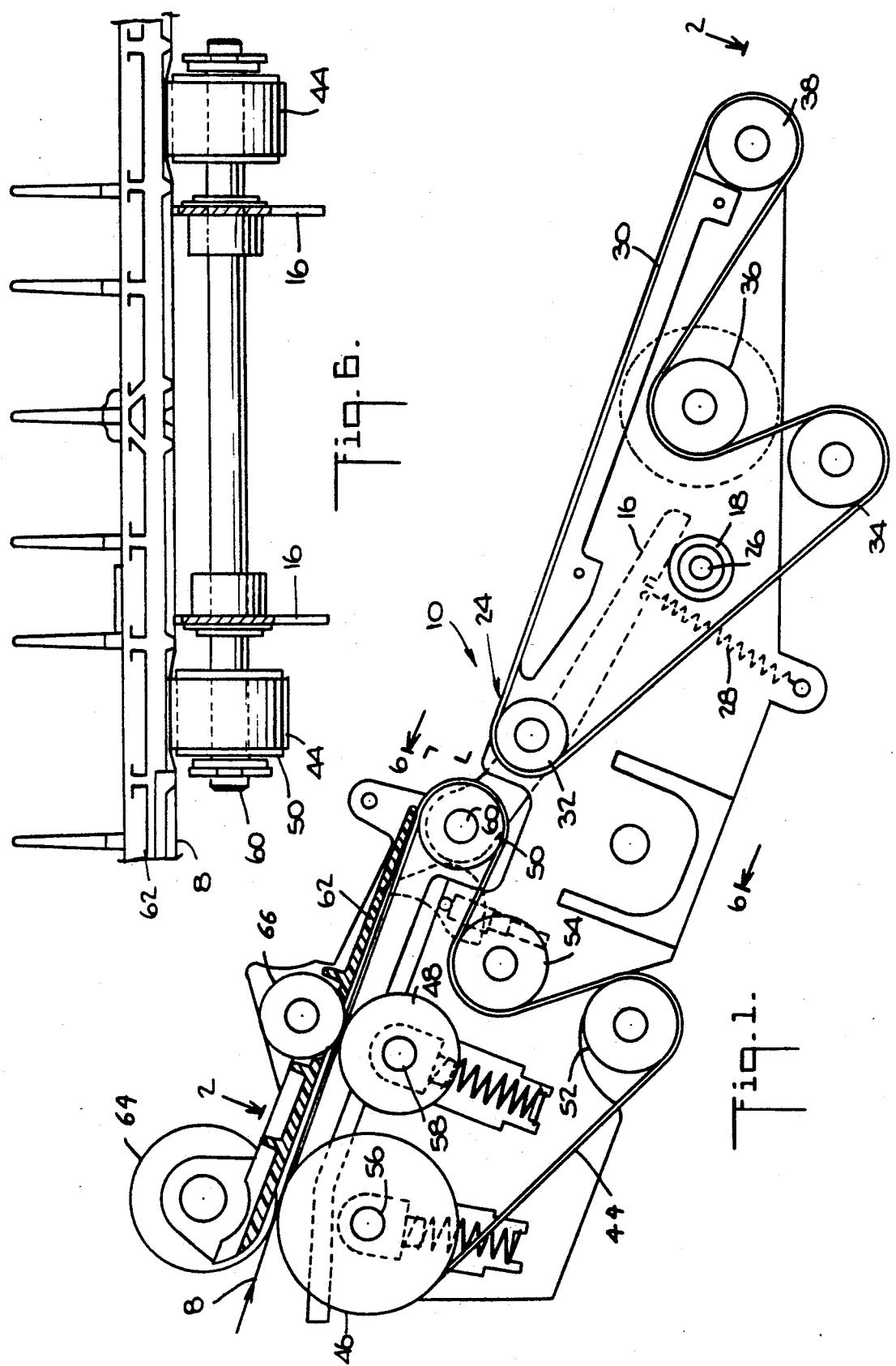

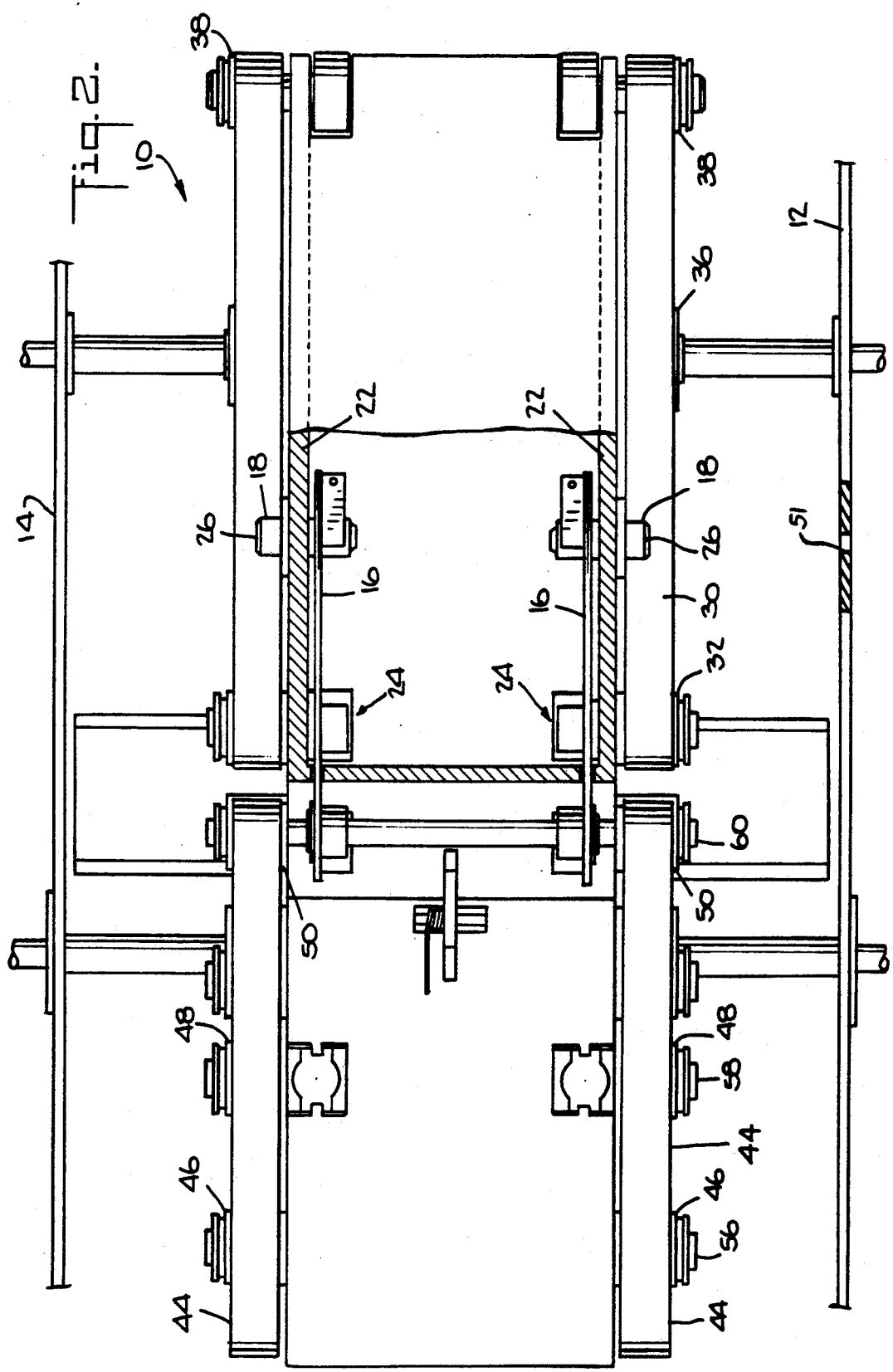

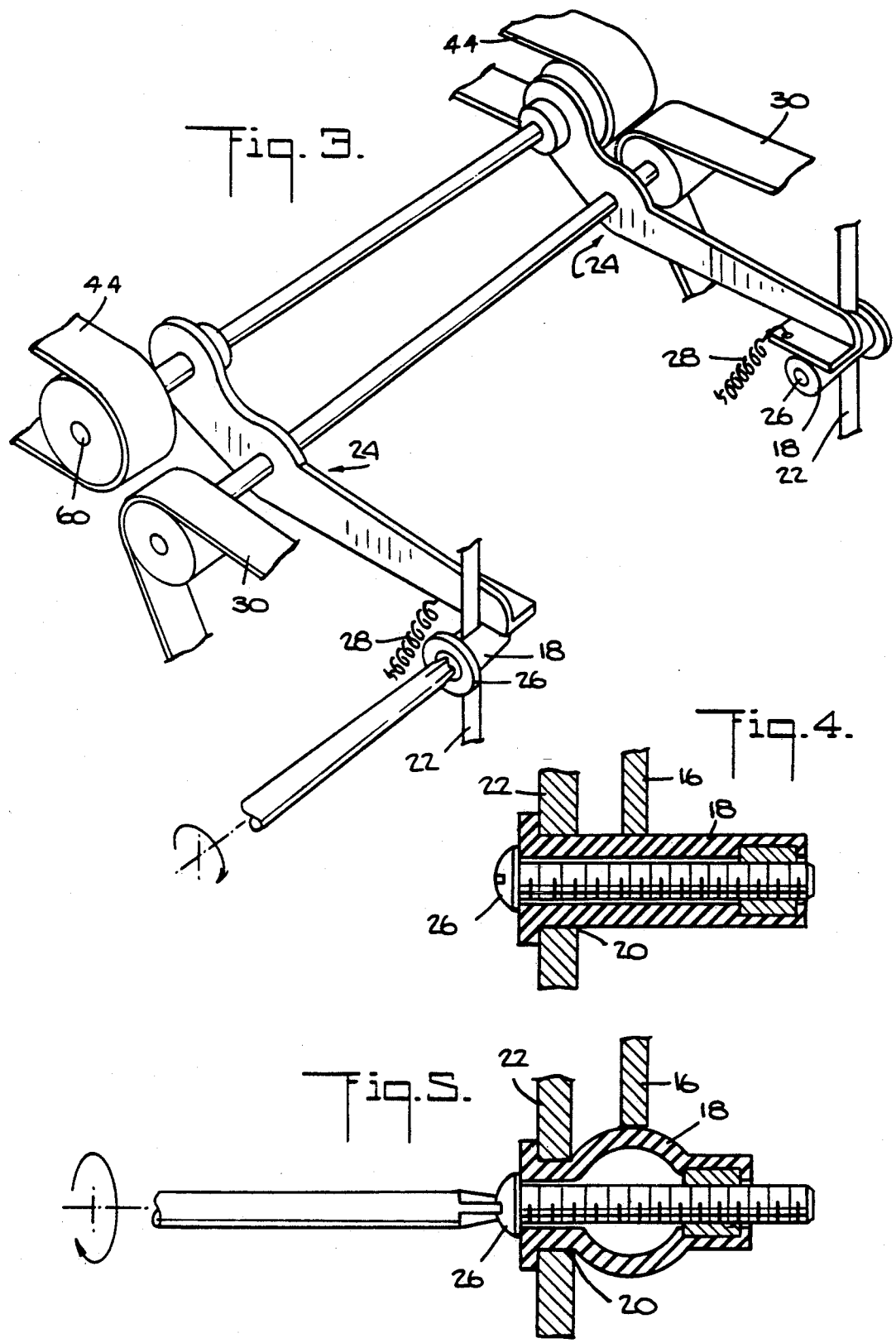

BLIND LEVER ARM ADJUSTMENT DEVICE

FIELD OF THE INVENTION

This invention relates to the adjustment of members, assemblies, and the like which are located in difficult to reach areas, and more particularly, the blind adjustment of lever arms to which access is restricted.

BACKGROUND OF THE INVENTION

It is well known to make mechanical adjustments of members, assemblies and mechanisms in mechanical and electromechanical machines. Such adjustments become difficult when the assembly, member and or mechanism is located on the inside portion of the machine. Accessibility to make adjustments is an important consideration in the design of the assemblies and components for the machine. In an inserting machine, there exists a number of assemblies and components which must be adjusted so that the inserting machine will properly feed, process and insert the enclosures. Access to some of the adjustable components and assemblies in the inserting machine is restricted because of the location of the components or assemblies in relation to the configuration or structure of the machine. This is even more true for small, compact machines, such as tabletop inserting machines, which by their very nature are limited in the space available to make such adjustments.

In a tabletop inserting machine, such as the Pitney Bowes 3100, accessibility for adjustment is a critical consideration during the design of assemblies and components located within the body of the machine. In console inserting machines, such as the Pitney Bowes 8300 Series Inserters, accessibility for adjustment is an important concern, but is not as critical as in tabletop inserting machines because the size of the console machine is much larger.

It is known to make adjustments within the frame of an inserting machine from a position or location external to the inserting machine. Typically, such external adjustments require complicated mechanisms to complete the internal adjustment from an external location on the machine. Generally, the more complicated the mechanism, the more likely problems will develop in making or holding the adjustment. When a problem or failure does occur, the repair to such adjustment mechanisms can be difficult and time consuming. This is particularly true for tabletop inserting machines which provide limited access to the internal structure of the inserting machine.

In U.S. Pat. No. 4,501,417, issued Feb. 26, 1985, to Foster et al. and assigned to the assignee of the present invention, an inserter feeder assembly having external control knobs for adjusting a separator stone and shield subassembly is described. U.S. Pat. No. 4,548,400, issued Oct. 22, 1985 to Foster et al. and assigned to the assignee of the present invention, describes an inserter gauging system having external slots with pointers and control knobs which position the pointers for adjusting the inserter's envelope stops, side guides and stripper fingers. In U.S. Pat. No. 4,728,095, issued Mar. 1, 1988, to Irvine, et al. and assigned to the assignee of the present invention, a separator assembly for a document feeder, including a retarding roller having a plurality of different surfaces which are selectable from an external control knob. These patents are representative of the various ways of making external adjustments on an inserter. While these devices are suitable for their respective application, such external adjustment devices are not suitable for fine tuning adjustments that may be necessary to adjust component spacing, for example spacing between rollers, for handling different types of material.

SUMMARY OF THE INVENTION

It has been discovered that a blind lever arm adjustment mechanism will allow blind, infinite increments of adjustment within the compression/expansion range of the device used. The adjustments can be made to internal assemblies from an outer frame location without the need for a complicated mechanical apparatus. It has further been discovered that this method is insensitive to vibration and does not require the use of a separate adjustment locking device.

An adjustment device for adjusting a lever arm located inside a machine frame wherein the lever arm is pivotally mounted to the frame at a first location and is spring biased against a stop at a second location of the frame. The device comprises a resilient sleeve having a shank portion adapted to extend through an aperture in the frame to act as the stop, and a head portion of larger diameter then the diameter of the aperture in the frame. The shank portion has a threaded section and a non-threaded section, the non-threaded section having a length greater than the frame thickness at the aperture, wherein the lever arm pivots as a screw extending axially through the sleeve is turned in the threaded section.

BRIEF DESCRIPTION OF THE DRAWINGS

A complete understanding of the present invention may be obtained from the following detailed description of the preferred embodiment thereof, when taken in conjunction with the accompanying drawings wherein like reference numerals designates similar elements in the various figures and, in which FIG. 1 is a top view of an inserting machine with the present invention mounted thereto;

FIG. 2 is a side view of the section of the inserting machine shown in FIG. 1;

FIG. 3 is a perspective view of the blind lever adjustment mechanism in accordance with the present invention;

FIG. 4 is a front view of the threaded insert portion of the present invention taken along the lines 4—4 as seen in FIG. 3.

FIG. 5 is the front view of the threaded insert portion with, as shown in FIG. 4, with the screw tightened;

FIG. 6 is a front view of the belts and guide plate of the section of the inserting machine of FIG. 1 taken along the lines 6—6.

DETAILED DESCRIPTION OF THE PRESENT INVENTION

The device described in this invention provides a means to adjust members, assemblies, and components which are located in difficult to reach areas in a machine. The present invention may be adapted for use in many products which have inherent adjustment problem areas. An inserting machine is used in the following description of the preferred embodiment of the present invention.

In describing the preferred embodiment of the present invention, reference is made to the drawings wherein there is seen an envelope insertion section of an inserting machine, generally designated 10, having a pair of sidewall frame members 12. The inserting machine includes an envelope feeder (not shown) for feeding envelopes and one or more document/insert feeders for feeding documents and inserts to insertion section 10 where the documents and inserts will be inserted into the envelopes. A more detailed description on the structure and operation of the insertion section is provided in U.S. patent application Ser. No. 646,482, filed Jan. 25, 1991, and assigned to the assignee of the present invention, which is incorporated herein by reference.

Referring now to FIGS. 1 through 4, a pair of lever arms 16 are pivotally mounted to opposite members of a frame assembly 22. A pair of threaded inserts 18 are each inserted in a hole 20 located in each member of frame assembly 22. Threaded inserts 18 are flanged, rubber-like bushings with a machine nut that is molded into the unflanged end. Holes 20 are at a fixed position relative to pivotal points 24 of lever arms 16. Adjustment screws 26 are threaded into threaded inserts 18. As each of screws 26 is tightened, the respective threaded insert 18 is drawn in toward the head of the screw, displacing the rubber like material into an annular ring-shaped configuration in the mid-section of the threaded insert. As seen in FIG. 5, the diameter of annular ring portion of threaded insert 18 increases as screw 26 is tightened, causing a rising motion in lever arm 16 about pivot point 24 resulting in an adjustment of roller 50 in a downward direction. A pair of springs 28 are used to bias one end of levers 16 against threaded inserts 18. In the preferred embodiment of the present invention, springs 28 have a spring load of two inch pounds per spring to prevent levers 16 from bouncing as inserts are conveyed over rollers 60.

The range of adjustment of this blind lever arm adjustment device is dependent on several factors, including the flexibility of the rubber-like material and the length of the body of the threaded insert relative to the thickness of each member of frame assembly 22. It will be appreciated by those skilled in the art, that no locking device is necessary once the adjustment is completed. Furthermore, the adjustment can be made blindly with regard to the diameter of the annular ring portion of threaded insert 18. It will be understood by those skilled in the art, that the material used for threaded insert 18 should have minimal memory characteristics.

In the preferred embodiment of the present invention, threaded inserts 18 are commercially available flanged rubber bushings with a machine nut molded into one end. An example of threaded inserts 18 is a WELL-NUT TM threaded insert manufactured by Molly, a Black & Decker Company of Temple, Pa. (Molly and WELL-NUT are registered trademarks of M. Hart Industries, Inc.) Such threaded inserts are generally used to fasten items such as metal, plastic and other mixed material fastenings in blind hole. In the present invention, a new use of the threaded inserts has been discovered. The WELL-NUT threaded insert is a flanged rubber bushing with a brass machine nut molded into one end. Tightening a conventional machine screw threaded in the brass nut causes the insert section of the WELL-NUT to expand, making a secure fastening.

Installation of the threaded insert is accomplished by placing the insert all the way into pre-drilled hole until flanged is firmly against the mounting surface. The machine screw is passed through part to be fastened and tightened until snug. In the preferred embodiment of the present invention, the WELL-NUT threaded insert used is catalogued J1420 for a hole diameter of 1½ inch usable for a plate thickness of ¼ inch and handling screw size of ¼-20.

It has been found that, in addition to providing a method and means for adjusting the roller position, the threaded insert provides the added advantage of dampening vibration and shock. The threaded insert is easily removable and installed with conventional tools.

In the preferred embodiment of the present invention, insertion section 10 of the inserting machine comprises three pairs of rollers 46, 48 and 50 mounted respectively on biased shafts 56, 58, and 60 which are biased in the direction of datum guide plate 62. Inserts 8 are fed to an envelope (not shown) by means of a pair of endless, drive belts 44 which are respectively trained over biased pairs of rollers 46, 48 and 50 and pairs of rollers 52 and 54. The upper reaches of belts 44 are biased upwardly toward datum guide plate 62 by means of springs which are mounted at one end to shafts 56 and 58 and which are fixed to ground at the other end. Two pairs of idler rollers 64 and 66 cooperate with drive belts 44 at rollers 46 and 48 to feed the inserts 8 toward the waiting envelope (not shown) which is held open above belt 30. At roller 60, on the other hand, there are no idler rollers to cooperate with the upper reaches of belts 44. Referring now to FIG. 6, rollers 60 are biased against the corrugated bottom side of datum guide plate 62. This provides a gripping of the inserts 8 by belts 44 at the downstream end of datum guide plate 62.

Insertion section 10 must handle inserts of various thicknesses including single documents and documents of various thicknesses. It has been found that having roller 60 spring biased towards guide plate 62 is not adequate to ensure that the inserts will be fed to the envelope. The pinching of inserts 8 between the non-moving datum guide plate 62 and moving biased belts 44 is critical. Too much or too little pinch results in a stall, i.e., the insertion of the inserts into the envelope is not completed.

The blind lever adjustment device of the present invention has been found to provide simple means for adjustment of rollers 60 to a position relative to datum guide plate 62 such that inserts feed properly into the envelope. It has been found that, in the preferred embodiment of the present invention, the critical adjustment is for a single sheet. Once rollers 60 are adjusted for single sheets, the insertion section can handle a stack of sheets up to one quarter inch.

In operation, the adjustment is made by inserting a screwdriver into hole 51 located in sidewall member 12 and turning screw 26 counterclockwise to raise roller 60 and clockwise to lower roll=r 60. In the preferred embodiment of the present invention, during the initial assembly a shim or feeler gauge is placed between belts 44 at roller 60 and datum guide plate 62. Screw 26 is tightened until the proper adjustment is reached according to the feeler gauge. It will be seen by those skilled in the art, that the adjustment to roller 60 is made without the need for any disassembly or opening of the machine. It has been found that the adjustment can safely be made through hole 51 in sidewall member 12 while the machine is running so that trial and error adjustments can be made quickly while inserts are being fed.

It will be appreciated by those skilled in the art, that replacement of threaded inserts 18 is straightforward. Screw 26 is unscrewed from insert 18 and insert 18 is removed from hole 20. A new insert 18 is inserted in hole 20 and screw 26 is tightened until roller 60 is at an appropriate position without the need to get inside the frame with any tools. No other assembly is required.

A more detailed description of insertion section 10 is provided in U.S. patent application Ser. No. 646,482, filed Jan. 25, 1991 and assigned to the assignee of the present invention, which is incorporated herein by reference.

The method described below will allow blind infinite increments of adjustment within the compression/expansion range of the device used. This method is insensitive to vibration and it does not require the use of a separate adjustment locking device.

It will be appreciated that there has been provided in accordance with the present invention a blind lever adjustment device that fully satisfies the objects aims an advantages set forth above. While the invention has been described in conjunction with specific embodiments thereof, many alternatives, modifications and variations will be apparent to those skilled in the art. Accordingly, it is intended to embrace all such alternatives, modifications and variations that follow within the spirit and scope of the appended claims.

What is claimed is:

1. An adjustment device for adjusting a lever arm located inside a machine frame wherein the lever arm is pivotally mounted to said frame at a first location and is spring biased against a stop at a second location of said frame, comprising a resilient sleeve having a shank portion adapted to extend through an aperture in said frame to act as the stop, said sleeve having a head portion of larger diameter then the diameter of the aperture in said frame, said shank portion having a threaded section and a non-threaded section, said non-threaded section having a length greater than frame thickness at said aperture, wherein the lever arm pivots as a screw extending axially through said sleeve is turned in said threaded section.

2. The adjustment device of claim 1 wherein the lever arm is raised when said screw is tightened into said threaded section and wherein the lever arm is lowered when said screw is loosened in said threaded section.

3. The adjustment device according to claim 1 wherein said sleeve comprises a flanged rubber bushing with a machine nut molded into one end.

4. An adjustment device for adjusting a lever arm located inside a machine frame wherein the lever arm is pivotally mounted to said frame at a first location and is biased at one end against a stop adjacent an aperture at a second location in said frame, comprising a resilient, hollow tubular member having a shank portion adapted to extend through the aperture and a head portion adapted to bear against one side of the frame around the aperture, said member having an axial opening through said head portion and into said shank portion, and an expander screw element centrally located within said axial opening and coupled to a threaded member located at an end of said shank portion wherein said shank portion of said tubular member changes shape and the lever arm pivots when said screw element is turned in said threaded member.

5. An adjustment device for adjusting a lever arm located inside a machine frame wherein the lever arm is pivotally mounted to said frame at a first location and is spring biased against a stop at a second location of said frame, comprising a resilient sleeve having a shank portion adapted to extend through an aperture in said frame to act as the stop, said shank portion having a length greater than frame thickness at said aperture, said sleeve having a head portion of larger diameter then the diameter of the aperture in said frame, and a threaded member located at an end of said shank, wherein the lever arm pivots as a screw extending axially through said sleeve is turned in said threaded member.

* * * * *